(12) United States Patent
Wang et al.

(10) Patent No.: US 8,473,473 B2
(45) Date of Patent: Jun. 25, 2013

(54) OBJECT ORIENTED DATA AND METADATA BASED SEARCH

(75) Inventors: Luming Wang, Bellevue, WA (US); Xiaohong Yang, Sammamish, WA (US); Hailei Zhang, Sammamish, WA (US); Sonal Jain, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 294 days.

(21) Appl. No.: 12/724,764

(22) Filed: Mar. 16, 2010

(65) Prior Publication Data

US 2011/0231385 A1    Sep. 22, 2011

(51) Int. Cl.
*G06F 7/00*    (2006.01)
*G06F 17/30*    (2006.01)

(52) U.S. Cl.
USPC .......................... 707/705; 707/709; 707/710

(58) Field of Classification Search
USPC ............... 707/705, 706, 707, 708, 709, 710, 707/711
See application file for complete search history.

(56) References Cited

U.S. PATENT DOCUMENTS

| 7,085,736 | B2 | 8/2006 | Keezer et al. |
| 2006/0136402 | A1 | 6/2006 | Lee |
| 2006/0287989 | A1 | 12/2006 | Glance |
| 2007/0038643 | A1 | 2/2007 | Epstein |
| 2007/0061301 | A1* | 3/2007 | Ramer et al. ...................... 707/3 |
| 2007/0094042 | A1* | 4/2007 | Ramer et al. ...................... 705/1 |
| 2008/0077556 | A1* | 3/2008 | Muriente ........................ 707/2 |

OTHER PUBLICATIONS

Martin, et al., "Using Metadata to Query Passive Data Sources", Proceedings of the Thirty-First Annual Hawaii International Conference on System Sciences HICSS, vol. 7, 1998, Retrieved at << http://ieeexplore.ieee.org//stamp/stamp.jsp?tp=&arnumber=00649223 >>, pp. 286-294.

Wang, et al., "Web Object Indexing Using Domain Knowledge", Proceedings of the eleventh ACM SIGKDD international conference on Knowledge discovery in data mining , International Conference on Knowledge Discovery and Data Mining , 2005, Retrieved at << http://research.microsoft.com/en-us/um/people/llu/Publications/KDD05_WebObject.pdf >>, pp. 10.

Stojanovic, et al., "A Framework for Knowledge Management on the Semantic Web", 2002, Retrieved at << http://citeseerx.ist.psu.edu/viewdoc/download?doi=10.1.1.18.7081&rep=rep1&type=pdf >>, pp. 3.

(Continued)

*Primary Examiner* — Vincent Boccio
(74) *Attorney, Agent, or Firm* — Turk IP Law, LLC

(57) ABSTRACT

An object oriented search mechanism extracts structural metadata and data based on type of document contents and data sources connected to the documents. Relationships between textual and non-textual elements within documents as well as metadata associated with the elements and data sources are utilized to generate a unified object model with the addition of semantic information derived from metadata and taxonomy, which are used to enhance search indexing, ranking of search results, and dynamic adjustment of result rendering user interface with fine tuned relevancy. Additional data from data sources connected to the documents may also be used to unlock hidden data such as data that has been filtered out in an original document.

18 Claims, 7 Drawing Sheets

OTHER PUBLICATIONS

Kao, et al., "Wisdom: Web Intra-Page Informative Structure Mining Based on Document Object Model ", May 2005, Retrieved at << http://cscl.iis.sinica.edu.tw/cscl/Publication/TKDE_WISDOM_second_revision.pdf >>, pp. 37.

Zheng, et al., "Architecture and Implementation of an Object-Level Vertical Search", International Conference on New Trends in Information and Service Science, 2009, Retrieved at << http://ieeexplore.ieee.org/stamp/stamp.jsp?arnumber=05260677 >>, pp. 264-268.

* cited by examiner

OBJECT ORIENTED DATA AND METADATA BASED SEARCH

BACKGROUND

Search engines discover and store information about documents such as web pages, which they typically retrieve from the textual content of the documents. The documents are sometimes retrieved by a crawler or an automated browser, which may follow links in a document or on a website. Conventional crawlers typically analyze documents as flat text files examining words and their positions (e.g. titles, headings, or special fields). Data about analyzed documents may be stored in an index database for use in later queries. A query may include a single word or a combination of words.

Usefulness of a search engine depends on the relevance of the result set it returns. While there may be a large number of documents that include a particular word or phrase, some pages may be more relevant, popular, or authoritative than others. Thus, many search engines employ a variety of methods to rank the results. Some search engines utilize predefined and/or hierarchically ordered keywords that have been preprogrammed. Other search engines generate the index by analyzing located texts automatically.

Traditional search engines such as the ones discussed above retrieve document contents and index them as plain text. Different types of documents are typically treated as a collection of plain text. Thus, relationships between metadata/data defined in the document as well as non-textual object related data are lost during crawl time. This loss of information, especially for documents that define structured data/metadata, prevents filtering and/or display of search results based on data/metadata structure.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to object oriented search, which extracts structural metadata and data based on type of document contents and data sources connected to the documents. According to some embodiments, relationships between textual and non-textual elements within documents as well as metadata associated with the elements and data sources may be utilized through a unified object model for search indexing and ranking of search results.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
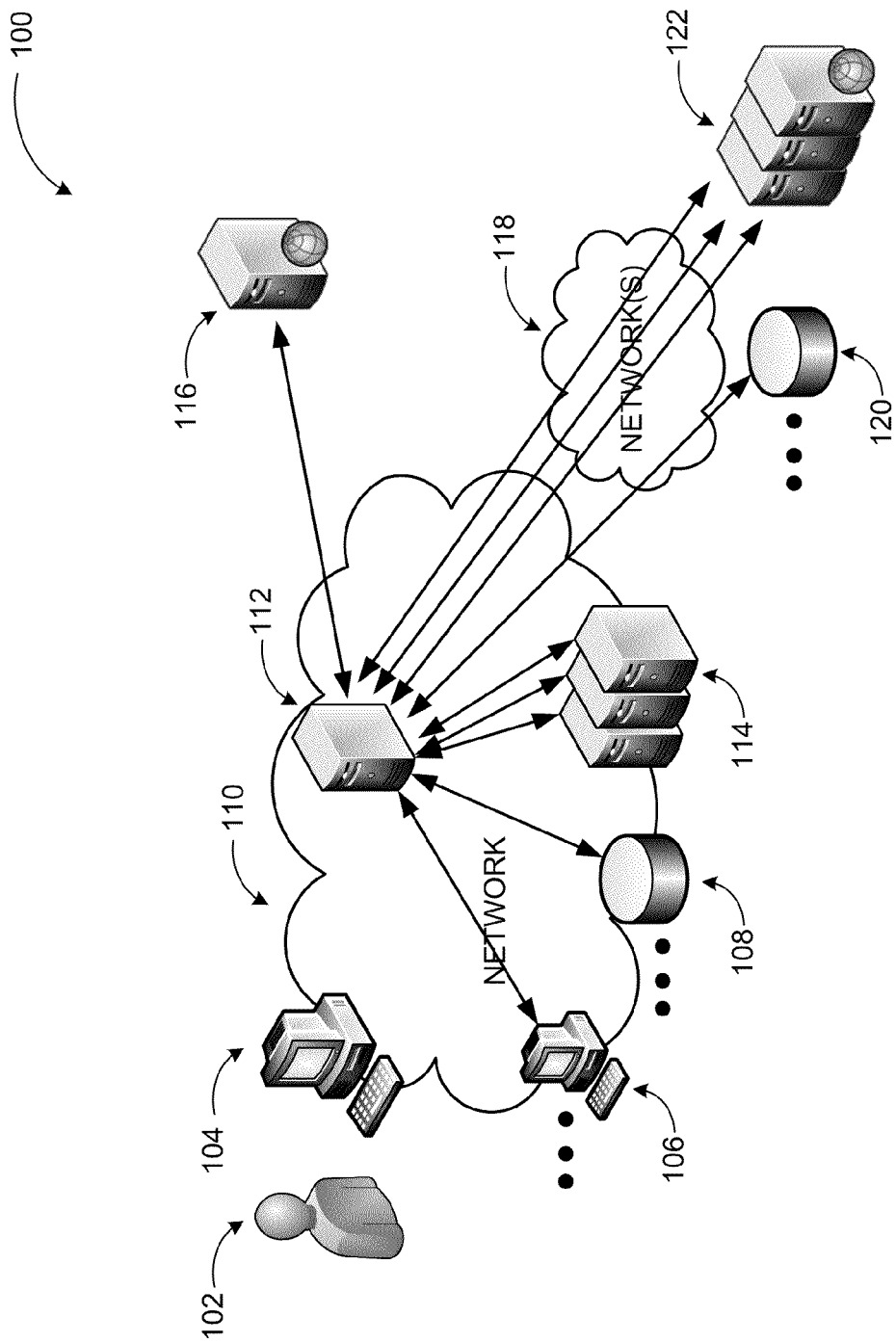
FIG. 1 is a conceptual diagram illustrating user role based search operations in a networked search environment.

As briefly described above, structural metadata and data may be extracted based on type of document contents and data sources connected to the documents. Relationships between textual and non-textual elements within documents as well as metadata associated with the elements and data sources may be utilized through a unified object model for search indexing and ranking of search results. Furthermore, the relationship/metadata information may be returned to a rendering client for enhancing a user interface layout and/or style and dynamically drive variations in result content display. Moreover, semantic information/key words for various parts of documents may be identified using the metadata extracted and a configurable taxonomy (classification of metadata and/or relationships between elements). In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk.

Throughout this specification, the term "platform" may be a combination of software and hardware components for managing computer and network operations, which may include searches. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 includes conceptual diagram 100 illustrating user role based search operations in a networked search environment. The networked search environment shown in diagram 100 is for illustration purposes. Embodiments may be implemented in various networked environments such as enterprise-based networks, cloud-based networks, and combinations of those.

Search engines employ a variety of methods to rank the results or index them based on relevance, popularity, or authoritativeness of documents compared to others. Indexing also allows users to find sought information promptly. When a user submits a query to a search engine (e.g. by using key words), the search engine may examine its index and provide a listing of matching results according to predefined criteria. The index may be built from the information retrieved from the contents of the crawled document and/or user data and the method by which the information is indexed. The query may include parameters such as Boolean operators (e.g. AND, OR, NOT, etc.) that allow the user to refine and extend the terms of the search.

A search engine according to embodiments enables enhanced indexing by considering internal element structure and relationships between elements in a crawled document (and crawling the elements themselves), and by further considering additional data retrieved from data sources associated with crawled documents and/or elements. A unified object model based on the element relationships and metadata may be used to set a scope and/or filters for the query. Furthermore, the element structure, external data source, and metadata information may further be used in search result ranking before rendering and for enhancing a user interface layout and/or style and dynamically drive variations in result content display at the rendering client. Moreover, semantic information/key words for various parts of documents may be identified using the metadata extracted and a configurable taxonomy (classification of metadata and/or relationships between elements). The information extracted, organized, ranked, and annotated may be indexed and stored for caching and faster retrieval when searched by a user.

User 102 may interact with a variety of networked services through their client 104. Client 104 may refer to a computing device executing one or more applications, an application executed on one or more computing devices, or a service executed in a distributed manner and accessed by user 102 through a computing device. In a typical system client 104 may communicate with one or more servers (e.g., server 112). Server 112 may execute search operations for user 102 searching documents on server 112 itself, other clients 106, data stores 108, other servers of network 114, or resources outside network 110.

In an example scenario, network 110 may represent an enterprise network, where user 102 may submit a search request. A search application on server 112 may perform object oriented crawl and evaluate documents based on their internal element structure and relationships, as well as associated metadata. The crawled documents and retrieved information may be indexed with additional information from data sources associated with crawled documents. The specialized information may also be organized into a unified object model to support scoping of search query(ies) and enhancing of result ranking. The search may also include resources outside network 110 such as server 116 or servers 122 and data stores 120, which may be accessed through at least one other network 118.

The example system in FIG. 1 has been described with specific servers, client devices, software modules, and interactions. Embodiments are not limited to systems according to these example configurations. An object oriented search system may be implemented in configurations employing fewer or additional components and performing other tasks. Furthermore, specific protocols and/or interfaces may be implemented in a similar manner using the principles described herein.

Figure 2:
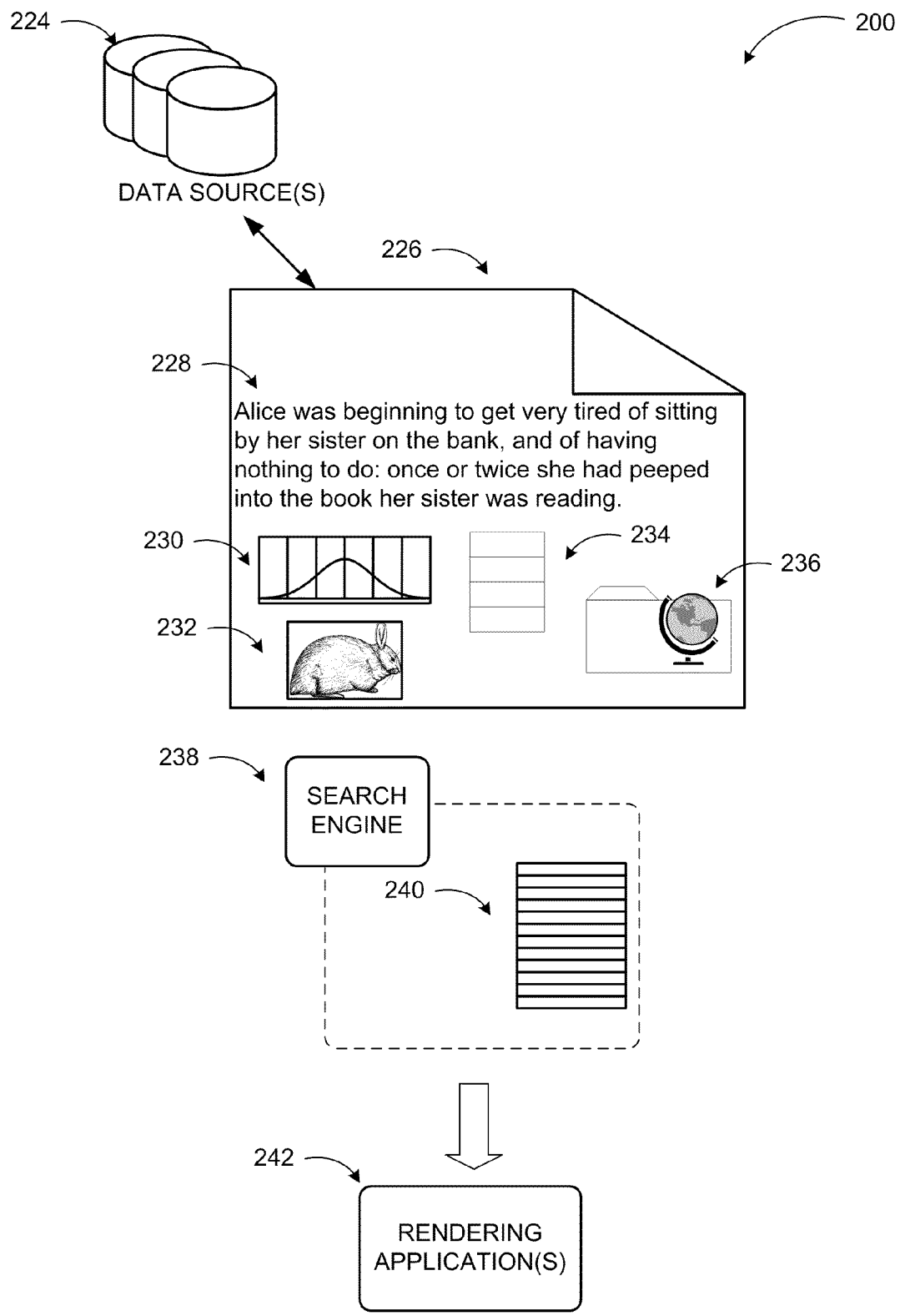
FIG. 2 is a conceptual diagram illustrating object oriented search.

FIG. 2 includes diagram 200 illustrating object oriented search. Search engines crawl documents on client devices, servers, data sources, etc. A search engine according to embodiments (e.g. search engine 238) may find documents that include textual data, graphic data, video data, tables, images, and similar forms of embedded content.

Document 226 is an example document with textual data 228, graphic chart 230, table 234, image 232, and video data 236. Some or all of the embedded elements (charts, images, video data, tables) may present data dynamically. Thus, the contents may receive data dynamically from an external data source (e.g. data sources 224) and present the data, while the data is not physically stored along with the document 226 itself. A conventional flat text search may not detect the dynamic data represented by any of these elements.

Search engine 238 not only searches data represented by the non-textual elements, but may also determine types of elements, relationships between the elements, and may retrieve relevant data from data sources 224. Search engine 238 may then index crawl results for faster search responses building index 240. The search engine may also rank search results based on the types of elements, relationships between elements, and the retrieved external data, and enable presentation of the additional information when search results are rendered by rendering application(s) 242 such that users can determine importance/relevance of a document for their search. Search engine 238 may also provide structural information and relationship between elements for a search client (rendering application(s) 242) to drive its user interface and result display dynamically.

Figure 3:
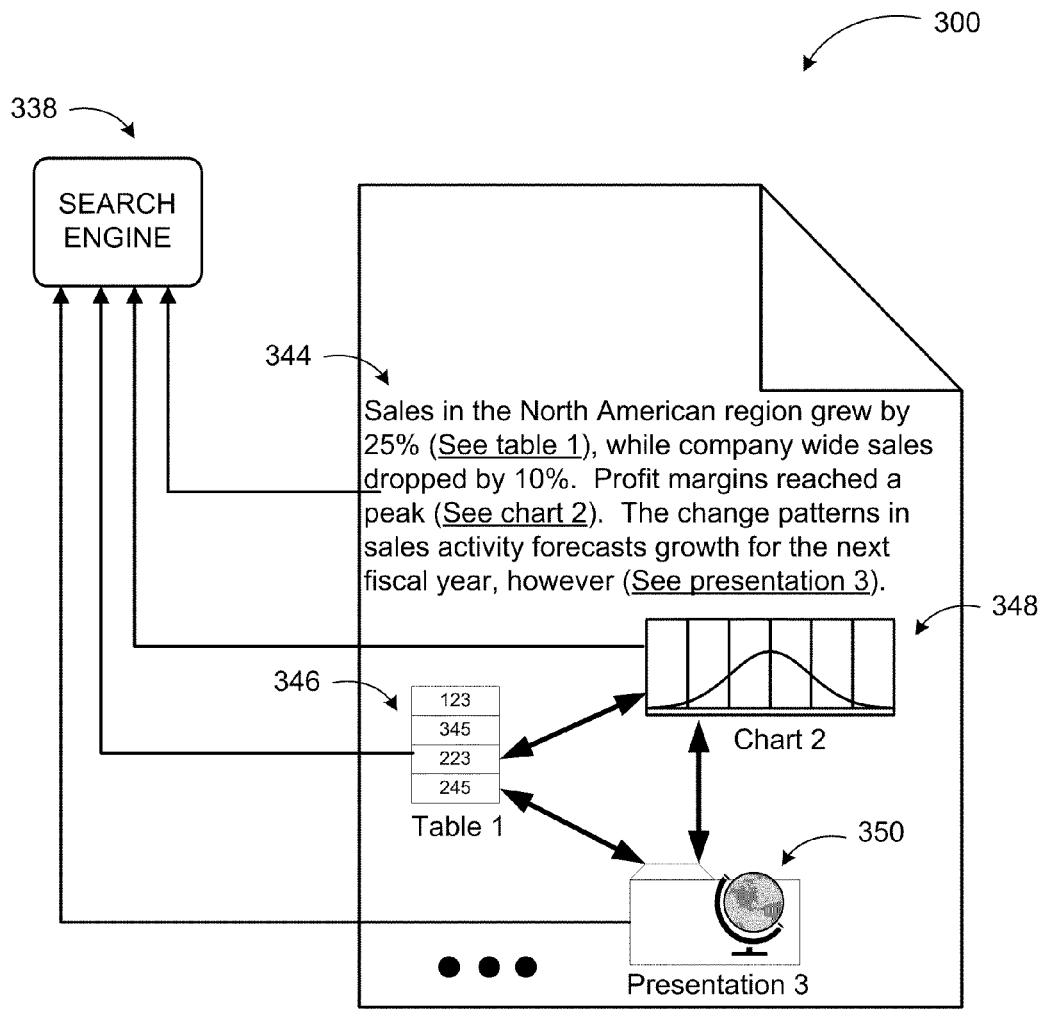
FIG. 3 is another conceptual diagram illustrating object oriented search taking into account relationships between elements in a document.

FIG. 3 is another conceptual diagram illustrating object oriented search taking into account relationships between elements in a document. According to one example scenario, a search engine such as search engine 338 of diagram 300 for enterprise clients may attempt to limit a scope of the search results to business intelligence documents such as spreadsheet documents that contains tables, charts, reports, diagrams, filtered charts/tables, and similar elements. Some of these elements may be generated by an application other than the spreadsheet application associated with the spreadsheet document and embedded into the spreadsheet document statically or dynamically (i.e. element data residing at an external source). Example document 336 includes textual report 344, table 346, chart 348, and video data (presentation) 350. Textual report 344 includes links to the individual non-textual elements. Furthermore, table 346 and chart 348 may be associated (e.g. part of the data in table 346 may be displayed in chart 348). Other relationships are also possible.

The search engine 338 may extract metadata structural information and create an object model that contains the details of the business intelligence related information. For example, a spreadsheet document may include multiple sheets filtering tables. Each filtering table may include a variety of filters. The spreadsheet document may further include diagrams and/or charts based on data that is stored in the spreadsheet document and/or stored at an external resource (e.g. another spreadsheet document, a data store, etc.). The charts and/or diagrams may be generated based on filtering the data according to one or more of the filters in the filtering table. Thus, the elements in the spreadsheet document may not reflect the entire extent of available data. Moreover, relationships between the elements (e.g. between the tables and charts, video data and tables, etc.) may be useful to a user in determining the importance or relevance of retrieved data and driving a search client user interface and result display dynamically.

Because the data in the spreadsheet document may be limited (e.g. filtered from the available data at the external data source), search engine 338 may retrieve additional information from the data source to enrich the search results. For example, additional dimension members beside the applied filter members may be retrieved from the data at the data source. Dimensions, hierarchies, and measure information of stored data may also be retrieved. Thus, detailed metadata and data may be retrieved in a structural and meaningful manner and used to scope the search results into business intelligence related documents and dynamically drive variations in result content display of a rendering application.

Since external data may be stored in different data sources such as various databases, servers, tables, and comparable ones, the metadata associated with each data and data storage may be different. Search engine 338 may determine data type associated with each discovered element within a document, range of data, and data storage type. Then, crawl operations may be customized to retrieve information associated with each element and data for each element.

As mentioned previously, a unified object model may be utilized to organize different kinds of metadata and data into more generic objects. The unified object model may be implemented as part of a business intelligence abstraction layer according to some embodiments. A user interface of a rendering application (or the search engine) may be adjusted in accordance with the indexing and ranking strategy, such that search results for different kinds of documents and document elements may be displayed in a unified and consistent manner. For example, data may be categorized as being associated with a chart, a table, a video, and comparable ones, and search results may indicate each result's category textually and/or graphically.

Figure 4:
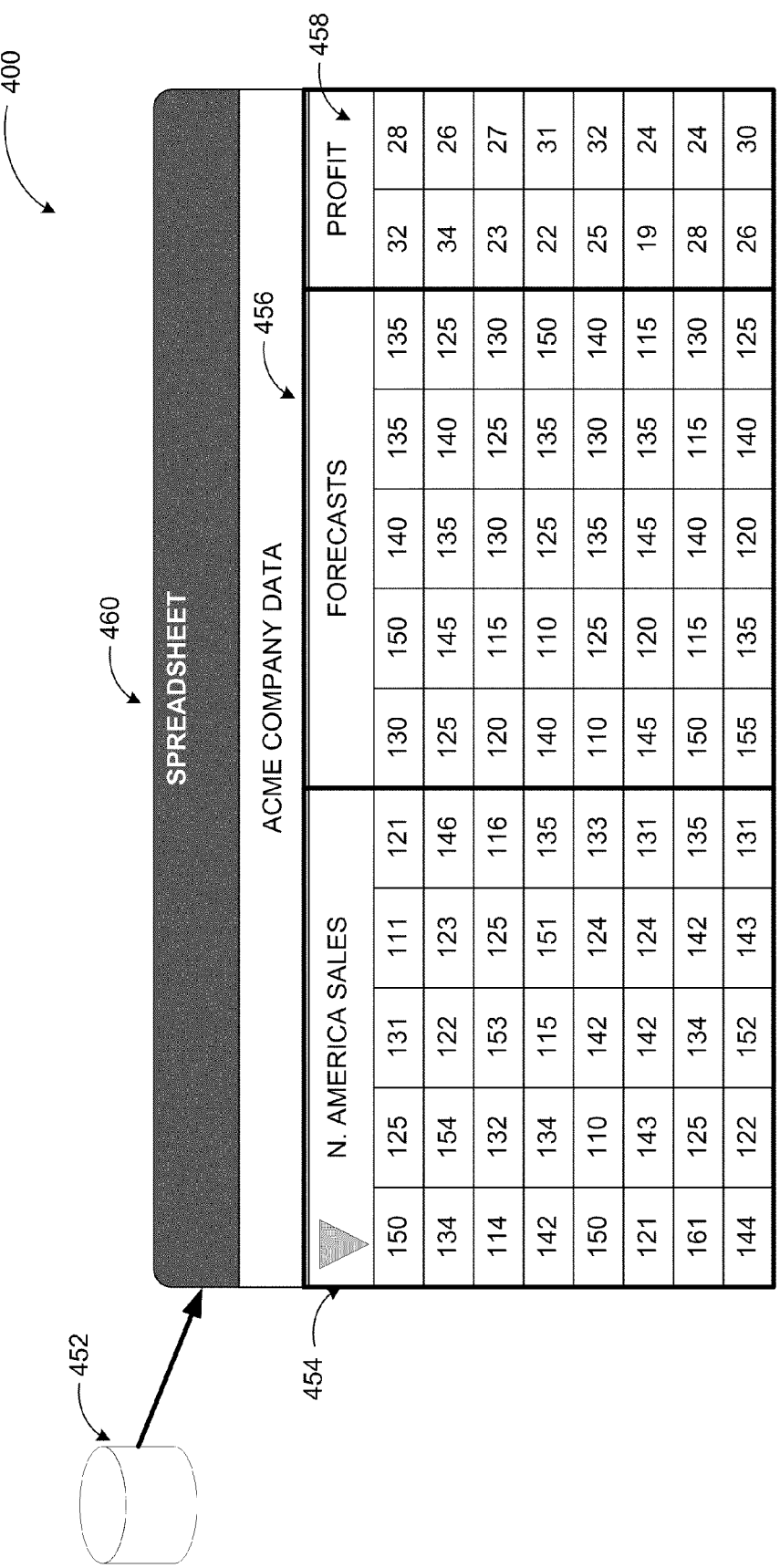
FIG. 4 illustrates an example object oriented search employing filtering parameters in a spreadsheet document according to embodiments.

FIG. 4 illustrates an example object oriented search employing filtering parameters in a spreadsheet document according to embodiments. Diagram 400 shows spreadsheet document 460, which includes financial data for a company. The financial data is displayed in three categories: North American Sales data 454, forecast data 456, and profit data 458. At least some of the data may be dynamically linked to an external data source 452. Thus, the externally linked data is stored and maintained (e.g. updated regularly) at the data source 452 and not stored as part of spreadsheet document 460. Part all of the displayed data may be as a result filtering. For example, data source 452 may store worldwide sales data for the company. Spreadsheet document 460 displays a portion of that data filtered geographically (North America). The filtering is indicated in the diagram by the triangular icon for illustration purposes.

A search engine according to embodiments, may determine a range of available data (e.g. worldwide sales) based on metadata associated with spreadsheet document 460, and render all of the sales data from data source 452 available. According to other embodiments, the search engine may determine a user's interests based on their profile or requested search terms and render another portion of the sales data available. For example, a sales person in Asia may be searching for sales data and the search engine may indicate in the search results that sales data for Asia is available from data source 452 in the format used by spreadsheet document 460 based on the metadata retrieved from spreadsheet document 460 (despite the spreadsheet not displaying Asia sales data).

The examples in FIGS. 2, 3, and 4 have been described with specific document types, objects, data types, and interactions. Embodiments are not limited to systems according to these example configurations. Object oriented search may be implemented in configurations using other types of documents, objects, and data in a similar manner using the principles described herein.

Figure 5:
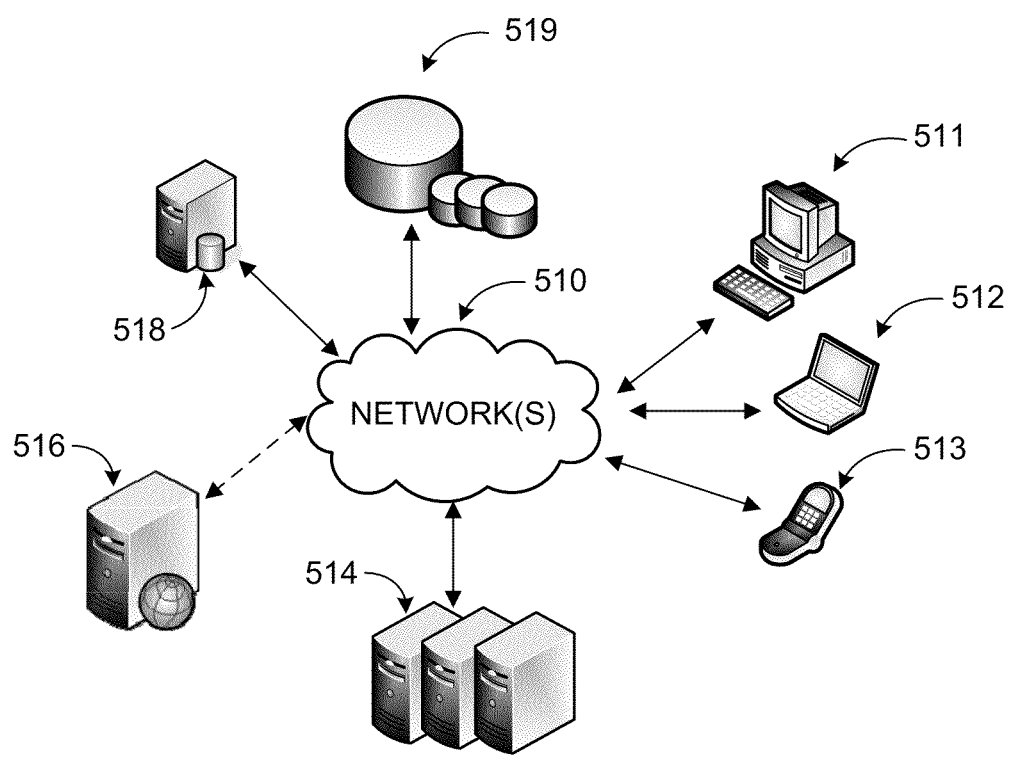
FIG. 5 is a networked environment, where a system according to embodiments may be implemented.

FIG. 5 is an example networked environment, where embodiments may be implemented. A platform providing object oriented searches may be implemented via software executed over one or more servers 514 such as a hosted service. The platform may communicate with client applications on individual computing devices such as a smart phone 513, a laptop computer 512, or desktop computer 511 ('client devices') through network(s) 510.

As discussed above, client applications executed on any of the client devices 511-513 may submit a search request to a search engine on the client device 511-513, on the servers 514, or on individual server 516. The search engine may crawl elements and relationships between elements within documents, retrieve data from data sources associated with crawled documents and elements, and index and rank based on collected information employing a unified object model as discussed previously. The service may retrieve relevant data from data store(s) 519 directly or through database server 518, and provide the ranked search results to the user(s) through client devices 511-513. The service may further provide filtering/scoping of results by the unified object model (e.g. search for "sales data" only occurring in form of tables or charts).

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to implement a framework for object oriented search. Furthermore, the networked environments discussed in FIG. 5 are for illustration purposes only. Embodiments are not limited to the example applications, modules, or processes.

Figure 6:
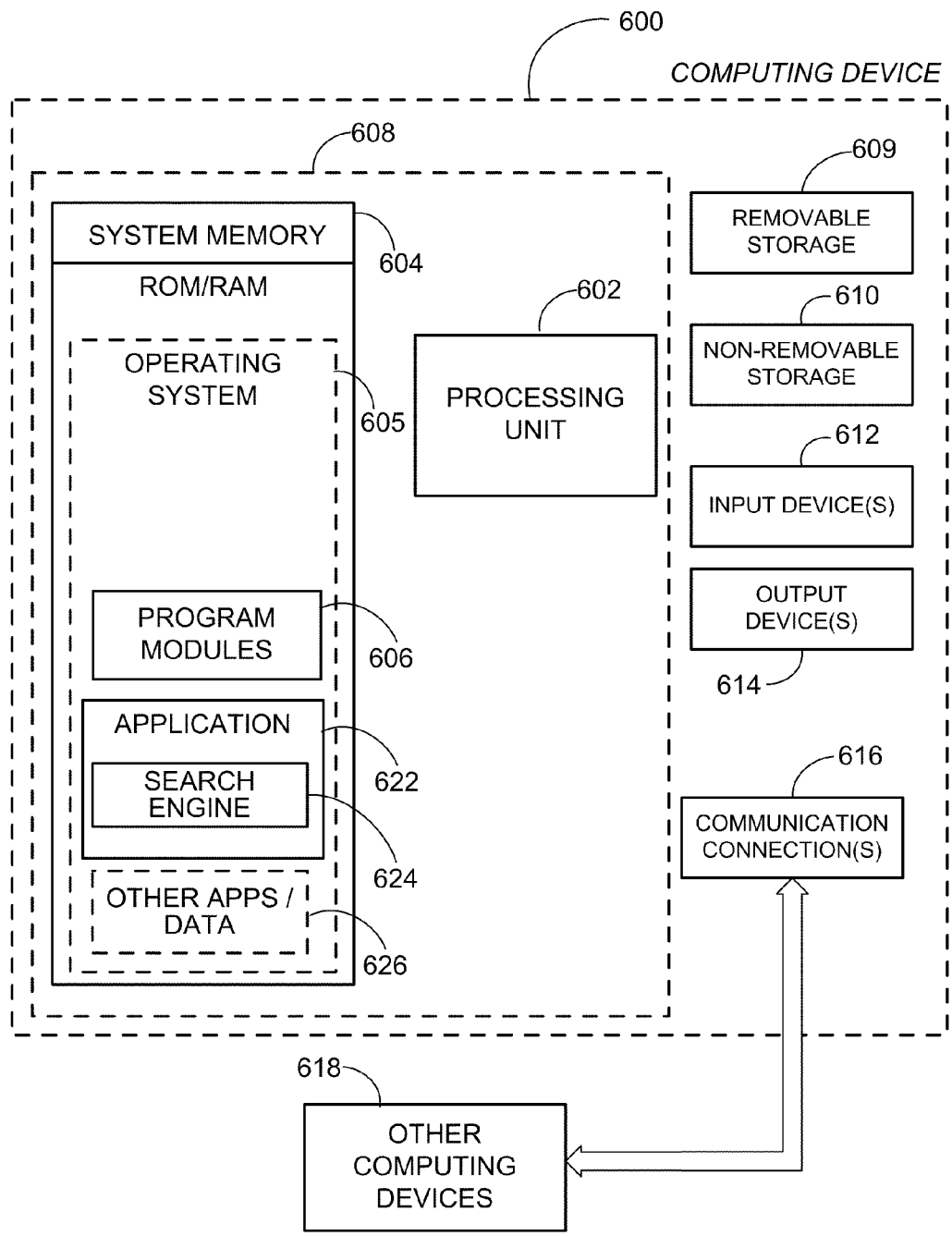
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be a client device executing a client application capable of performing searches or a server executing a service capable of performing searches according to embodiments and include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606, search capable application 622, search engine 624, and optionally other applications/data 626.

Application 622 may be any application that is capable of performing search through search engine 624 on other applications/data 626 in computing device 600 and/or on various kinds of data available in an enterprise-based or cloud-based networked environment. Search engine 624 may perform searches, index, and rank results taking elements, element relationships, and data from associated data sources as discussed previously. Search engine 624 according to embodiments may generate search results by listing data available from documents, embedded elements, and external data sources associated with the documents and embedded elements. The elements may be embedded into the documents partially based on external data dynamically provided to the documents from a database, another document, or similar sources. Moreover, the rendered search results may include an indication of result type for each search result, where the result type may include a document description, an embedded element description, or an external data source description. Application 622 and search engine 624 may be separate applications or an integral component of a hosted service. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wired or wireless network in a distributed computing environment, a satellite link, a cellular link, a short range network, and comparable mechanisms. Other devices 618 may include computer device(s) that execute communication applications, other web servers, and comparable devices. Communication connection(s) 616 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
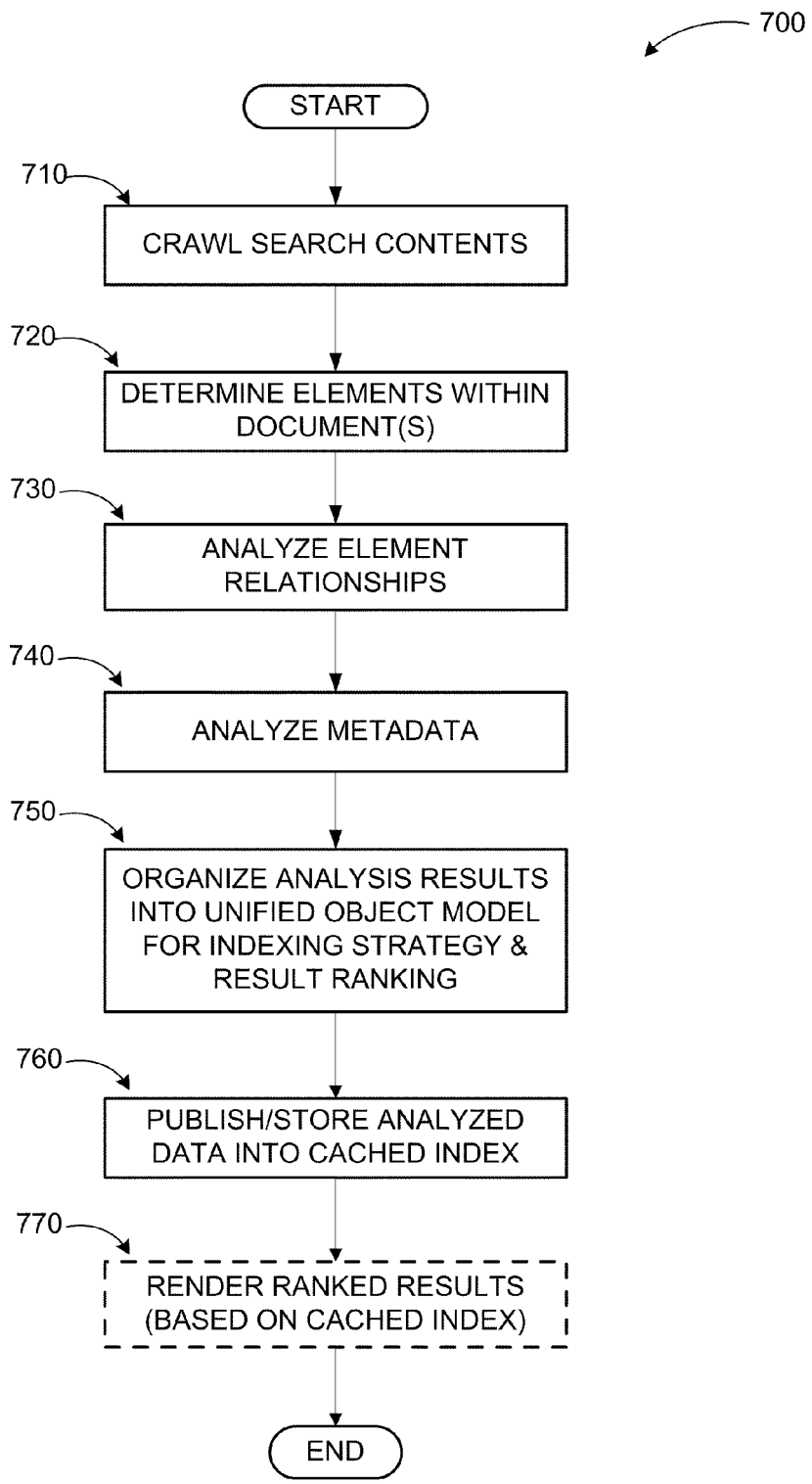
FIG. 7 illustrates a logic flow diagram for a process of performing object oriented and metadata based search according to embodiments.

FIG. 7 illustrates a logic flow diagram for process 700 of performing object oriented and metadata based search according to embodiments. Process 700 may be implemented as part of an application executed on a server or client device.

Process 700 begins with operation 710, where search contents are crawled for indexing purposes. As discussed previously searches may be performed in a desktop environment, an enterprise-based network, a cloud-based network, or a combination of an enterprise-based network and a cloud-based network. At operation 720, elements within documents in the search range are determined during crawl time. The elements may include any textual and non-textual elements such as tables, charts, video data, and comparable ones. The elements found in the document(s) and their relationships may be analyzed at operation 730. For example, charts and tables may be based on same data. Such relationships may assist the user to determine relevance and/or importance of a document for their search.

At operation 740, metadata associated with the document and the objects may be analyzed. Some elements in the document(s) may rely on data externally provided from a data source. Metadata may identify such data sources and type of data, range of data, etc. Operation 740 may be followed by operation 750, where the analysis results are organized into a unified object model for defining indexing strategy and ranking results to be rendered to the user. For example, the elements may be categorized according to their type, and a source of data and a type of element associated with each element indicated in rendered search results.

A process according to embodiments may include caching an index for subsequent use in rapid rendering of search results. At operation 760, the analysis results may be published/stored into the cached index, which may be used in rendering search results by the search engine or a rendering application at optional operation 770. The source of data and the type of element may be indicated in the search results employing a graphical scheme and/or a textual scheme.

The operations included in process 700 are for illustration purposes. Object oriented and metadata based search may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for performing object oriented searches, the method comprising:
   crawling searched contents;
   determining textual and non-textual elements within a document of the searched contents, at least some of the non-textual elements including external data received dynamically from an external data source;
   analyzing relationships between the textual and non-textual elements;
   analyzing metadata associated with the document and the textual and non-textual elements;
   organizing analysis results of the relationships and the metadata into a unified object model
   using the unified object model to set a scope and at least one filter for a query; and
   using one or more of element structure, the external data source, and the metadata for search result ranking before rendering and for enhancing a user interface layout and style at a rendering client.

2. The method of claim 1, further comprising:
   determining from the metadata at least one from a set of: a type of data associated with an element, an external data source associated with the element, and a range of available data associated with the element;
   categorizing the elements according to their type; and
   indicating a source of data and a type of element associated with each element in rendered search results.

3. The method of claim 2, further comprising:
   deriving the semantic information and keywords from the metadata and the categorization of the metadata; and
   using the semantic information and the keywords in at least one from a set of: forming search queries, indexing, ranking and search results.

4. The method of claim 2, wherein the source of data and the type of element are indicated employing at least one of a graphical scheme and a textual scheme.

5. The method of claim 1, wherein the non-textual elements include at least one from the set of: graphic data, an image, a video element, a chart, a diagram.

6. The method of claim 1, further comprising:
   determining additional data available from the external data source associated with the at least one of the elements; and
   rendering the additional data available among the ranked search results.

7. The method of claim 1, wherein the search is performed in one of a desktop environment and a networked environment.

8. The method of claim 1, wherein the external data source includes one of: a document and a database on one of a server, a client device, and a data store, and the method further comprises:
   determining a type of the external data source; and
   indicating the type of the external data source in rendered search results.

9. The method of claim 8, further comprising:
   customizing crawl operations based on the types of external data sources associated with each element.

10. A computing device for facilitating object oriented searches in a networked system, the computing device comprising:
    a memory;
    a processing unit coupled to the memory, the processing executing a search engine in conjunction with instructions stored in the memory, wherein the search engine is configured to:
    crawl searched contents;
    determine embedded textual and non-textual elements within a document of the searched contents, at least some of the non-textual elements including external data received dynamically from an external data source;
    analyze relationships between the embedded textual and non-textual elements, the non-textual elements including at least one from the set of: graphic data, an image, a video element, a chart, a diagram;
    analyze metadata associated with the document and the embedded elements;
    organize different types of metadata and data associated with the embedded textual and non-textual elements into generic objects employing a unified object model;
    include semantic information and keywords derived from categorized metadata in the unified object model;
    set a scope and at least one filter for a query using the unified object model;
    implement indexing strategy based on the relationships between the embedded textual and non-textual elements and metadata represented by the generic objects;
    publish indexing results from an indexing store;
    rank the search results based on types of elements, the dynamically received external data, the relationships between the embedded textual and non-textual elements and metadata represented by the generic objects, wherein the search results are ranked before rendering using one or more of element structure, the external data source, and the metadata; and
    provide the ranked search results to a client application for rendering through an output device, wherein a user interface layout and style of the client application is enhanced using the element structure, the external data source, and the metadata.

11. The computing device of claim 10, wherein the search engine is further configured to generate the search results by listing data available from documents, embedded textual and non-textual elements, and external data sources associated with the documents and embedded textual and non-textual elements.

12. The computing device of claim 10, wherein the rendered search results include an indication of result type for each search result, the result type including one of a document description, an embedded element description, and an external data source description.

13. The computing device of claim 10, wherein the search results include at least a portion of data available from the external data source associated with an embedded non-textual element but not rendered by the embedded non-textual element.

14. The computing device of claim 10, wherein the search is performed on at least one from a set of: a database source, an analysis service, a portal, another server, and a desktop.

15. The computing device of claim 10, wherein the system comprises one of: an enterprise-based network, a cloud-based network, and a combination of an enterprise-based network and a cloud-based network.

16. A computer-readable storage medium with instructions stored thereon for performing object oriented searches, the instructions comprising:

crawling searched contents;

determining textual and non-textual elements within a document of the searched contents, at least some of the non-textual elements including external data received dynamically from an external data source;

analyzing relationships between the textual and non-textual elements, wherein the non-textual elements include at least one from a set of: a chart, a diagram, a video presentation, and an image;

analyzing metadata associated with the document and the textual and non-textual elements;

organizing different types of metadata and data associated with the elements into generic objects employing a unified object model such that a scope of search results is limited to business intelligence documents, wherein the unified object model includes semantic information derived from the analyzed metadata and types of elements;

using the unified object model to set a scope and at least one filter for a search query;

ranking the search results based on types of elements, the dynamically received external data, the relationships between the textual and non-textual elements, and metadata represented by the generic objects;

using one or more of element structure, the external data source, and the metadata for search result ranking before rendering and for enhancing a user interface layout and style at an output device; and rendering the search results comprising ranked documents, elements, and external data made available through the elements through the output device, wherein the search results indicate each result's category through one of a textual scheme and a graphical scheme.

17. The computer-readable storage medium of claim 16, wherein the instructions further comprise:

customizing a user interface of a rendering application in accordance with an indexing and ranking strategy based on types of elements, the dynamically received external data, the relationships between the textual and non-textual elements, and metadata represented by the generic objects such that search results representing documents, elements, and external data are displayed in a unified and consistent manner.

18. The computer-readable storage medium of claim 16, wherein the unified object model is part of a business intelligence abstraction layer of a business application enabling the search and rendering the search results.

\* \* \* \* \*